March 28, 1944.   D. WENDEL   2,345,518
TIRE TREAD AND METHOD OF MAKING THE SAME
Filed Jan. 24, 1941
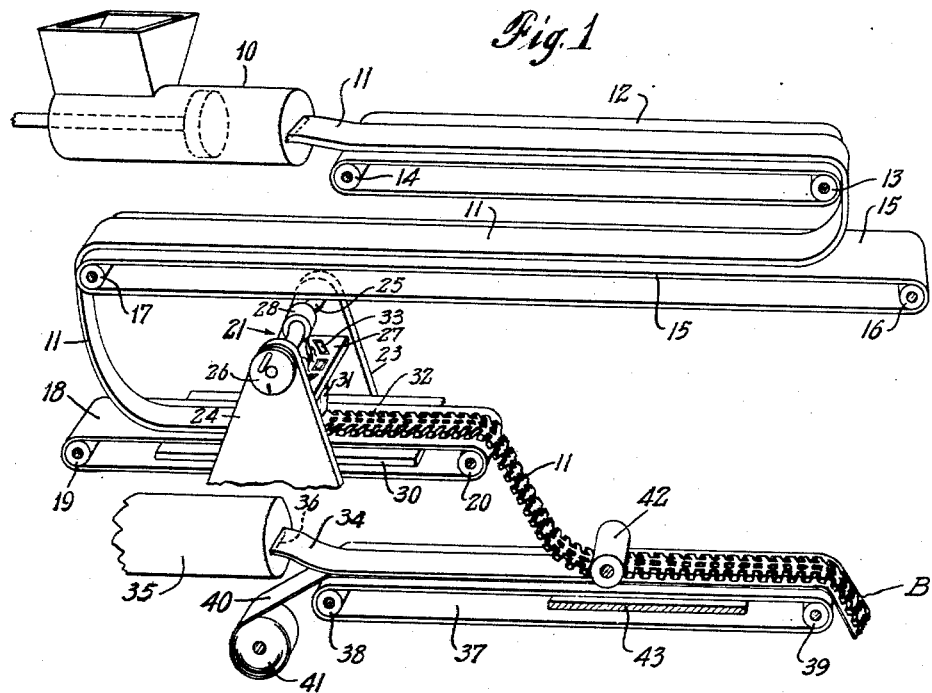
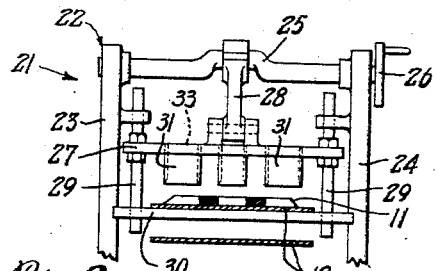
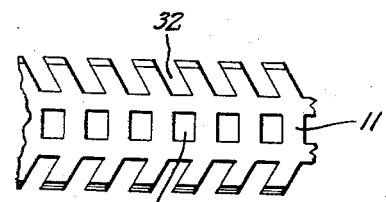
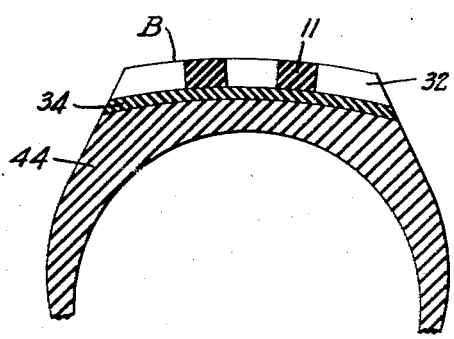
INVENTOR
David Wendel
BY
ATTORNEY Patented Mar. 28, 1944

2,345,518

UNITED STATES PATENT OFFICE 2,345,518

TIRE TREAD AND METHOD OF MAKING THE SAME

David Wendel, Johnstown, Pa., assignor to Webster Rubber Company, Warren, Ohio, a corporation of Ohio Application January 24, 1941, Serial No. 375,752

3 Claims. (Cl. 154—14)

This invention relates to the recapping or retreading of tires, and relates more particularly to replacement tread portions, their preparation, and their application to tire carcasses.

In recapping or retreading a tire, it is usual to strip or buff the old and worn tread from the tire, and to secure a cured or semi-cured tread band to the carcass by means of rubber cement, after which the tread is vulcanized or completely cured. The vulcanizing operation is usually preformed in a pressure vulcanizing mold, which forms the non-skid pattern or design in the face of the tire tread. Alternatively, the tread band may be formed with a smooth outer surface which is later treated as by the cutting or by the addition of rubber to produce the non-skid pattern thereon.

The above described methods are expensive to practice, for the reason that a large number of molds is required to retread the various sizes of tires when the pattern is formed by the molds, and a large amount of skilled manual labor is required when the tread portions are formed by hand operations. Moreover, in the latter operation there is a considerable waste of material which adds to the expense of the operation.

In accordance with the present invention, the retreading or recapping operation may be practiced at low cost and with a minimum of equipment by the use of tread portions of a type embodying the invention.

In its broadest aspects, the invention comprises the preparation of a tread band for retreading or recapping operations which is formed of green or uncured rubber, and which has a suitable tread pattern formed therein during its manufacture. Such tread bands may be applied to the carcass of the tire and cured thereon by treatment with steam in an open kettle, without substantial pressure being exerted on the tire. Inasmuch as the tread is already provided with a pattern when applied to the tire, it is unnecessary to cure the tread in a mold or to form a pattern on the tread after curing, thereby minimizing the work entailed and the equipment required in the retreading operation.

More particularly, the invention includes the preparation of tread bands having non-skid patterns thereon which could not be formed by simple extruding operations and therefore require a special treatment in order to form a raised and recessed pattern upon a band or strip of rubber, such that protection to the carcass is afforded by the tread band.

For a better understanding of the present invention, reference may be had to the accompanying drawing, in which:

Figure 1 is a perspective view of a typical form of device for forming the tread band;

Figure 2 is a view in end elevation of a device for forming the non-skid pattern in the tread band;

Figure 3 is a perspective view of a section of the tread band disclosing the pattern imparted thereto; and Figure 4 is a view in section of a tire with the tread band applied thereto.

A typical form of tread band embodying the invention may be produced by means of the apparatus disclosed in Figures 1 and 2. As disclosed in Figure 1, the device includes an extruding press 10 by means of which uncured or green rubber is extruded as a strip 11 of a generally trapezoidal cross-section. It will be understood that the rubber has been suitably compounded for wear-resisting purposes, and is in a plastic condition as it is extruded. The extruded band of rubber may be received on an endless conveyor 12, supported by suitable rolls 13 and 14 which are driven to advance the rubber at a rate corresponding closely to the rate at which it is extruded. The rubber strip 11 then drops from the conveyor 12 to a second conveyor 15, suitably supported by rolls 16 and 17 which carry it along in reverse direction, allowing it to dry somewhat and to a certain extent lose some of its sticky characteristics, so that it may be handled and subsequently processed without difficulty. If desired, the strips may be dried by placing them between the fabric leaves of books and allowing them to stand for a short period of time.

From the conveyor 15, the strip of rubber travels to third conveyor 18 which is supported by rollers 19 and 20 and is delivered to a cutting or punching device 21 by means of which the non-skid pattern is imparted to the strip.

The cutting device 21 may suitably consist of a framework 22 having uprights 23 and 24 at opposite ends thereof in which is journalled a crank 25. The crank may be driven by means of a hand wheel 26 or, if desired, may be driven in synchronism with the conveyor 18 by means of suitable gearing (not shown). The crank 25 reciprocates a punching head 27 by means of a connecting rod 28. The punching head 27 is provided with guide rods 29 which pass through a platform 30 which is disposed between the flights of the conveyor belt 18 and supports the upper flight thereof. The punching head 27 is provided with a plurality of hollow cutting members 31 which may be of any desired shape and as illustrated, may be of generally rectangular cross-section so as to make narrow rectangular cuts through the strip 11, as shown particularly in Figure 3. The outermost cutters 31 may be inclined with respect to the axis of the strip 11 in order to form a herringbone pattern 32 in the band 11.

The cutter elements 31 receive the material severed from the tread band 11 and this material is forced, as the cutting operation continues, out through the apertures 33 in the cutting head 27, where it may be collected and reused. Drying of the rubber prior to punching the pattern therein prevents the rubber from adhering to the cutter elements 31.

Inasmuch as the band 11 has the tread pattern 32 extending entirely through it, it is necessary to provide a backing strip to afford protection to the carcass being retreaded. The backing strip 35 may be formed by extruding green or uncured rubber from an extruding press 34 having a die plate provided with an elongated narrow slot 36 therein. The backing strip 35 is extruded onto a continuously moving conveyor 37 supported on rolls 38 and 39, which is disposed beneath the conveyor 18 in a position to receive the patterned tread band 11. As the backing strip 35 is extruded, it may be received on a strip of fabric 40, supplied from a roll 41 so as to protect and maintain the under surface of the backing strip 35 in sticky condition. The tread band strip 11 is delivered by the conveyor 18 on top of the backing strip 35 and is rolled into coextensive bonding contact therewith while the strip 35 is still in its soft and tacky condition. A pressure roller 42 disposed above the conveyor 37 engages the tread band strip 11 and presses it against the backing strip 35. A suitable platform 43 may be interposed between the flights of the conveyor 37 opposite the roller 42, providing a firm support for the uniting operation.

At the completion of the above described operation, a continuous unitary tread band B has been produced which may be divided, preferably by severing the strip on the bias, into suitable lengths for application to tire carcasses.

The tire carcass to be recapped or retreaded may be prepared in any suitable manner for reception of the composite tread band B, such as for example by sanding the worn tread surface of the tire 44. The tread band B consisting of the strips 11 and 35 may then be secured to the smoothed surface of the tire carcass 44, as shown in Figure 4, by means of rubber cement. Thereafter the tread band B and the cemented joint between it and the carcass may be cured in any suitable manner, such as for example in a steam chest, a vulcanizing kettle, or a low pressure autoclave without molding or treating the tread band.

With some types of tread patterns, namely those having relatively large recesses between the raised ribs, it may be desirable to keep the tread band 11 separate from the backing strip 35 until they are applied to the tire carcass. When the completed band B is applied to the carcass, all the pressure is applied to the raised portion of the tread and air, as a consequence, may be trapped between the backing strip 35 and the carcass beneath the recessed portions of the tread. By applying the backing strip 35 to the prepared carcass, it is possible to stitch or roll the strip into place without trapping air between the strip and the carcass. The tread band 11 may then be rolled or stitched to the backing strip and the whole vulcanized as described above.

The procedures described above eliminate the need for pattern-forming molds or high pressure autoclaves for applying satisfactory and long-wearing anti-skid treads to tire carcasses. Thus, the smallest tire repair establishments can practice the invention with a minimum of equipment and a minimum of waste, for the reason that the tread bands may be supplied in any desired length suitable for application to the standard sizes of tires.

From the above description of the invention, it will be apparent that by using recapping or retreading bands of the type embodying the present invention, the recapping or retreading of tires is greatly facilitated. Moreover, it will be apparent that the size, shape, proportions and patterns imparted to the tread band may be varied as desired, and without departing from the invention. It is also apparent that, although the invention has been described in connection with the recapping or retreading of used tires, it is equally applicable to applying the novel tread band to new tire carcasses. Accordingly, it will be understood that the above described typical embodiment of the invention is illustrative only and should not be considered as limiting the scope of the following claims.

I claim:

1. A non-skid tread band adapted for retreading a tire carcass and vulcanization in open heat, comprising a strip of uncured rubber having slots extending inwardly from its lateral edges defining ribs therebetween, and a thin imperforate strip of uncured rubber secured to the first-mentioned strip, closing the bottoms of said slots and supporting and retaining said ribs in position.

2. A method of preparing a tread band adapted for retreading tire carcasses and vulcanization in open heat, comprising extruding a strip of uncured rubber, punching a plurality of apertures completely through the mid-portion and slots through the lateral edge portions of said strip to form a non-skid pattern in said strip, and securing said strip to a backing strip of uncured rubber to close the bottoms of said apertures and said slots, support the first-mentioned strip and prevent distortion of the pattern formed therein.

3. A method of preparing a tire carcass retread band adapted to be vulcanized in open heat, which comprises forming a strip of uncured rubber, punching a plurality of slots through the lateral edge portions of said strip at an angle to said edge portions to form a non-skid pattern therein, and securing said strip to a backing strip of uncured rubber adapted to overlie the tire carcass, close the bottoms of said slots, and support the first mentioned strip to prevent distortion of the pattern formed therein.

DAVID WENDEL.